C. F. BURGESS.
BATTERY HAND LAMP.
APPLICATION FILED MAR. 24, 1917.
1,299,911.
Patented Apr. 8, 1919.
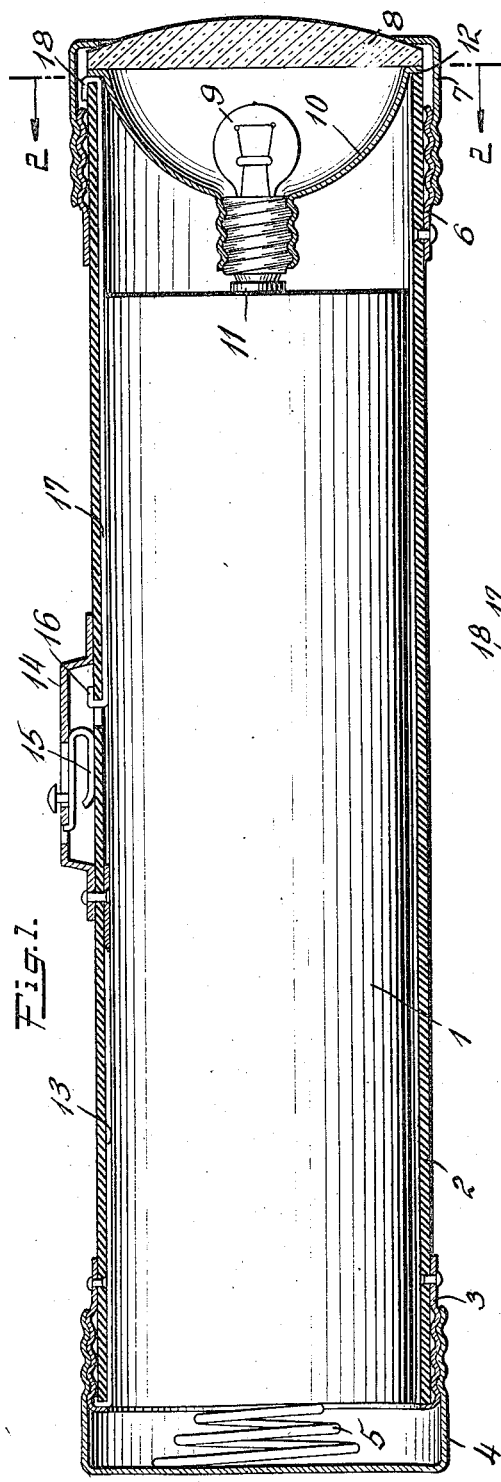
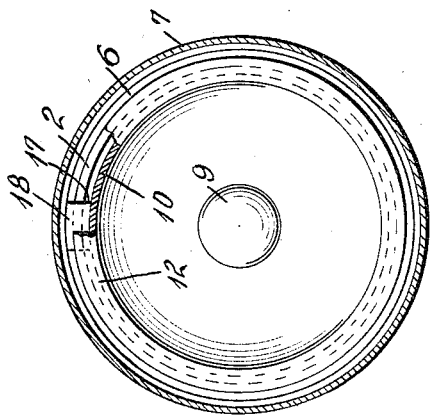
INVENTOR
C. F. BURGESS.
BY
*Pennie Davis Marvin & Edmonds*
ATTORNEY

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

BATTERY HAND-LAMP.

1,299,911.      Specification of Letters Patent.      Patented Apr. 8, 1919.

Application filed March 24, 1917. Serial No. 157,204.

*To all whom it may concern:*

Be it known that I, CHARLES F. BURGESS, a citizen of the United States, and residing in Madison, county of Dane, and State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps or flashlights of a type adapted for carrying in the pocket, and provided with a miniature lamp to which current may be delivered from a battery inclosed in the casing of the device.

It is an object of the present invention to provide means of the general character disclosed in my Patent No. 1,084,926, issued January 20, 1914, for protecting the lamp against accidental lighting, by so inclosing certain parts of the electrical connections that accidental contact across the exposed metal parts of the device will not be effective to light the lamp.

For a more complete understanding of this and other objects and advantages of the invention, reference is made to the following description, which is to be taken in conjunction with the accompanying drawings, wherein—

Figure 1 is a sectional elevation of a tubular hand lamp; and

Fig. 2 is a transverse cross-section on the line 2—2 of Fig. 1.

In the embodiment illustrated in the drawing, the battery 1 comprises a pair of galvanic cells, or other suitable member, arranged end to end in usual manner within a pasteboard tube.

The battery is housed in a casing 2, here illustrated as comprising a tube of insulating material, preferably fiber reinforced at its rear or bottom end with a threaded metal collar 3, to which is detachably secured an end cap 4 provided with a spiral spring 5 which bears against the naked bottom of the lowermost cell of the battery to establish electrical connection therewith.

The other end of the tubular casing is reinforced with an exposed metal collar 6 which terminates short of the front edge of the insulating casing, and which has a screw-thread pressed therein for engagement with a threaded lens holder 7 which may be of metal and shaped to engage the edge of a glass lens 8.

Within the front end of the tubular battery casing is a lamp 9 threaded or otherwise suitably secured in a reflector or equivalent conductive supporting member 10. The innermost lamp terminal contacts directly with the central battery terminal 11. The front edge of reflector 10 is preferably bent outward to form a peripheral flange 12 which seats upon and is insulated by the front edge of fiber tube 2. The flange does not extend outward far enough to contact with the metal lens holder 7.

As a means for establishing electrical connection from the bottom of the battery to the outer terminal of the lamp, I make use of a conductor 13 contacting with metal collar 3 and therefore electrically connected with spring 5. This conductor 13 may be riveted to a housing 14 mounted near the middle of the tubular casing, and may be provided with a sliding contact device of the type disclosed and claimed in the patent to Maisel, No. 1,082,887, issued December 30, 1913. This device comprises a U-shaped strip of resilient metal having its inner leg 15 arranged to slide along the outer face of the fiber tube into and out of contact with a lug 16. Other well known contact devices of proper construction may of course be used for completing the connection between conductor 13 and lug 16, but preferably these should be of such construction that lug 16 is completely housed and inaccessible to inadvertent connection with other metal parts when the hand lamp is carried about in a kit of metal tools. The lug 16 may consist of the clenched or hooked end of a metal strip 17 which extends along the inside of the insulating tube between it and the battery, and has its front end 18 hooked over the bare front edge of the fiber tube and contacting with the peripheral flange 12 of the reflector, but preferably being out of contact with collar 6 and the lens holder 7.

With this arrangement of circuits, the outer terminal of lamp 9 is electrically connected with reflector 10 and conductor 17, but normally is insulated from all other parts of the device, and particularly is insulated from all exposed metal parts, and consequently an accidental lighting of the lamp by bridging its exposed metal parts is not possible.

To renew the batteries, it is only necessary to unscrew cap 4, whereupon the batteries may be slipped out and new ones put in their place. Other parts of this structure are also easily accessible, for by unscrewing the lens holder, the lens and the reflector and its lamp may be taken out and access can be had to the top of the batteries, or, if desired, the batteries may be withdrawn through the front end of the casing, as, for instance, when their removal through the bottom end has been made difficult or impossible through sticking by corrosion of cap 4 on collar 3. With the lens, reflector and lamp thus removed from the front end and cap 4 removed from the bottom end and the battery withdrawn through either end, the casing is substantially unobstructed from end to end, permitting ready adjustment or repair of the interior conductors 13 and 17. Conductor 17 is reliably held in position by its hooked ends, and its front end is protected and rendered inaccessible by lens holder 7, while its rear end 16 is protected and rendered inaccessible by housing 14. I attach particular importance to the hooked form of the front end of strip 17 because of the security in mounting thereby obtained and the certainty of good contact with reflector 10, and when, as shown and preferred, the hooked end is not in contact with collar 6 or lens holder 7, the device is wholly free from danger of accidental lighting or, to use a common trade expression, is "non-short-circuiting".

I claim:—

1. In a hand lamp, the combination of a tubular insulating casing, a battery in said casing, a detachable cap closing the rear end of said casing and by the removal of which said battery may be withdrawn through said rear end, a spring carried by said cap and engaging the bottom of said battery and establishing electrical connection therewith, a lamp connected with the other end of said battery, a reflector wherein said lamp is seated, a lens for said lamp, a metal collar reinforcing the front end of said insulating casing and terminating short of the front edge thereof, supporting means for said lens secured to said collar and clamping said reflector in place, a conductive strip having one end hooked over the front edge of said insulating casing and contacting with said reflector, and conductive means for electrically connecting said strip with said spring when the lamp is to be lighted.

2. In a hand lamp, the combination of a tubular insulating casing, a battery in said casing, a detachable cap closing the rear end of said casing and by the removal of which said battery may be withdrawn through said rear end, a spring carried by said cap and engaging the bottom of said battery and establishing electrical connection therewith, a lamp connected with the other end of said battery, a reflector into which said lamp is threaded, said reflector having a peripheral flange which is seated against the front edge of said insulating casing, a lens for said lamp, a metal collar reinforcing the front end of said insulating casing, supporting means for said lens secured to said collar and clamping said reflector in place, a conductive strip having its front end hooked over the front edge of said casing and contacting with said reflector, said strip being insulated from said collar and from said lens supporting means, and conductive means for electrically connecting said strip with said end cap when the lamp is to be lighted.

3. In a hand lamp, the combination of a tubular insulating casing unobstructed from end to end, a battery in said casing removable through the front end thereof when desired, a detachable metal cap closing the rear end of said casing and by the removal of which said battery may be withdrawn through said rear end, a spring carried by said cap and engaging the bottom of said battery and establishing electrical connection therewith, a lamp connected with the other end of said battery, a reflector wherein said lamp is seated, a lens for said lamp, a metal collar reinforcing the front end of said insulating casing and terminating short of the front edge thereof, supporting means for said lens secured to said collar and clamping said reflector in place, a conductive strip contacting with said reflector, said strip being insulated from said collar and from said lens-supporting means, and conductive means for electrically connecting said strip with said end cap when the lamp is to be lighted.

In testimony whereof I affix my signature.

CHARLES F. BURGESS.